(12) United States Patent
Chien et al.

(10) Patent No.: US 7,923,483 B2
(45) Date of Patent: Apr. 12, 2011

(54) OPTICAL FIBER RIBBON WITH IMPROVED STRIPABILITY

(75) Inventors: Ching-Kee Chien, Horseheads, NY (US); Michelle Dawn Fabian, Horseheads, NY (US); Edward John Fewkes, Horseheads, NY (US); Michael James Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 295 days.

(21) Appl. No.: 11/728,525

(22) Filed: Mar. 26, 2007

(65) Prior Publication Data

US 2007/0238801 A1    Oct. 11, 2007

Related U.S. Application Data

(62) Division of application No. 11/291,565, filed on Nov. 30, 2005, now Pat. No. 7,257,299.

(51) Int. Cl.
C08F 2/50 (2006.01)
C08J 3/28 (2006.01)
C09D 11/00 (2006.01)

(52) U.S. Cl. ............ 522/181; 522/75; 522/81; 522/12; 522/18; 522/103; 522/182; 106/31.13; 106/31.6

(58) Field of Classification Search .......... 522/75, 522/81, 12, 18, 103, 182, 181; 106/31.13, 106/31.6
See application file for complete search history.

(56) References Cited

U.S. PATENT DOCUMENTS

| | | | |
|---|---|---|---|
| 4,474,830 A | 10/1984 | Taylor | 427/54.1 |
| 4,608,409 A | 8/1986 | Coady et al. | 524/199 |
| 4,609,718 A | 9/1986 | Bishop et al. | 528/49 |
| 4,752,112 A | 6/1988 | Mayr | 350/96.23 |
| 4,851,165 A | 7/1989 | Rennell, Jr. et al. | 264/1.5 |
| 4,962,992 A | 10/1990 | Chapin et al. | 350/96.23 |
| 5,104,433 A | 4/1992 | Chapin et al. | 65/3.1 |
| 5,486,378 A | 1/1996 | Oestreich et al. | 427/163.2 |
| 5,949,940 A | 9/1999 | Botelho et al. | 385/114 |
| 6,130,980 A | 10/2000 | Murphy et al. | 385/115 |
| 6,187,835 B1 * | 2/2001 | Szum et al. | 522/96 |
| 6,319,549 B1 | 11/2001 | Szum et al. | 427/163.2 |
| 6,326,416 B1 | 12/2001 | Chien et al. | 522/91 |
| 6,362,249 B2 | 3/2002 | Chawla | 522/182 |
| 6,438,306 B1 * | 8/2002 | Bishop et al. | 385/128 |
| 6,498,883 B1 * | 12/2002 | Wilson | 385/114 |
| 6,501,890 B1 | 12/2002 | Wilson et al. | 385/114 |
| 6,531,522 B1 | 3/2003 | Winningham | 522/96 |
| 6,539,152 B1 | 3/2003 | Fewkes et al. | 385/114 |
| 6,553,169 B2 | 4/2003 | Fabian | 385/128 |
| 6,563,996 B1 | 5/2003 | Winningham | 385/128 |
| 6,775,451 B1 | 8/2004 | Botelho et al. | 385/128 |
| 6,797,740 B2 * | 9/2004 | Abel et al. | 522/81 |
| 6,849,333 B2 | 2/2005 | Schissel et al. | 428/392 |
| 6,859,600 B2 | 2/2005 | Khudyakov et al. | 385/128 |
| 6,869,981 B2 | 3/2005 | Fewkes et al. | 522/33 |
| 6,876,807 B2 | 4/2005 | Lanier et al. | 385/128 |
| 7,174,079 B2 * | 2/2007 | Abel et al. | 385/128 |
| 7,176,543 B2 * | 2/2007 | Beernink | 257/439 |
| 7,214,431 B2 | 5/2007 | Komiya et al. | 428/411.1 |
| 2001/0025062 A1 * | 9/2001 | Szum et al. | 522/96 |
| 2003/0002831 A1 | 1/2003 | Chandraiah et al. | 385/114 |
| 2003/0063882 A1 * | 4/2003 | Bishop et al. | 385/128 |
| 2003/0100627 A1 * | 5/2003 | Bishop et al. | 522/153 |
| 2003/0123839 A1 | 7/2003 | Chou et al. | 385/145 |
| 2003/0169989 A1 * | 9/2003 | Abel et al. | 385/128 |
| 2004/0062501 A1 * | 4/2004 | Abel et al. | 385/128 |
| 2004/0247273 A1 | 12/2004 | Fabian et al. | 385/128 |
| 2005/0084224 A1 | 4/2005 | Greer et al. | 385/128 |
| 2005/0158000 A1 | 7/2005 | Szum et al. | 385/128 |
| 2007/0031096 A1 | 2/2007 | Moorjani et al. | 385/128 |
| 2008/0090931 A1 * | 4/2008 | Nagvekar et al. | 522/114 |

FOREIGN PATENT DOCUMENTS

WO    WO 9013579 A1 * 11/1990
WO    WO 9850317 A1 * 11/1998

OTHER PUBLICATIONS

W. Rutsch et al. Recent developments in photoinitiators. Progress in Organic Coatings 27, 1996, pp. 227-239.*
Decker et al. Performance analysis of acrylphosphine oxides in photoinitiated polymerization. Polymer, vol. 42, issue 18, Aug. 2001, pp. 7551-7560.*
Dr Pietschmann. UV curing of Black Pigmented Coating Material. Online editorial from PCI dated Jan. 31, 2001 obtained on Nov. 20, 2008. Retrieved from internet from <URL : http://www.pcimag.com/CDA/Archives/30e257d6286a7010VgnVCM100000f932a8c0>.*

* cited by examiner

Primary Examiner — Sanza L McClendon
(74) Attorney, Agent, or Firm — Robert L. Carlson

(57) ABSTRACT

An optical fiber ribbon includes a plurality of optical fibers encapsulated within a matrix material, where the optical fiber coating(s) and the matrix material(s), and optionally any ink layers thereon, are characterized by compatible chemical and/or physical properties, whereby the fiber coating and matrix and any ink layers therebetween can be reliably stripped from the optical fibers to afford a suitable strip cleanliness. Novel ink formulations that can be used in the making of such fiber optic ribbons, methods of making such ribbons, and their use are also described.

14 Claims, 2 Drawing Sheets

OPTICAL FIBER RIBBON WITH IMPROVED STRIPABILITY

CROSS-REFERENCE TO RELATED APPLICATIONS

This application is a divisional of U.S. application Ser. No. 11/291,565, filed on Nov. 30, 2005 now U.S. Pat. No. 7,257,299, the content of which is relied upon and incorporated herein by reference in its entirety, and the benefit of priority under 35 U.S.C. §120 is hereby claimed.

FIELD OF THE INVENTION

The present invention relates generally to optical fiber and optical fiber ribbons, and more particularly to coatings for optical fiber and to curable compositions for use in coating optical fiber.

BACKGROUND OF THE INVENTION

Optical fibers are often bundled together in parallel fashion to form a product known as an optical fiber ribbon. The ribbon includes optical fibers that have been encased in a polymeric matrix material to secure the fibers in the parallel arrangement. The matrix portion of the ribbon can include one or more layers of the polymeric matrix material, and each optical fiber typically contains a dual layer coating system that includes a soft, inner polymer coating and a hard, protective outer polymer coating. Prior to forming the ribbon, the optical fibers may also be coated with a thin colored layer of marking ink (i.e., in a polymer base) for purposes of fiber identification within the ribbon.

The most basic function of the ink is to provide a means for identifying individual fibers in both ribbon and loose tube cables during installation. Photoinitiators are used to initiate the polymerization process when the inks are exposed to UV light during the inking process. The pigments also absorb light so obtaining a fast cure speed is a challenge. Fast cure speed is desired as the ink should be well cured prior to putting the fibers in a ribbon or cable. If the ink is under-cured this can cause problems including, but not limited to, increased surface friction, poor ribbon peel performance (where the matrix material forms a very high bond with the ink due to residual acrylate groups on the ink surface), and the propensity for the ink layer to come off of the fiber during ribbon handling or stripping. A fast cure speed is also desirable to ensure robust process performance. For example, if the lamp intensity becomes low or the quartz tube in the lamp assembly becomes dirty, less UV light will be available to cure the inks and the result will be a low degree of cure on the inked fiber. Inks with low cure speeds are also disadvantaged from the standpoint that inking line speeds cannot be increased to facilitate higher output. Therefore, there is a need for radiation curable marking inks that have sufficient cure speed to overcome the above described challenges.

During use, the ribbon unit must be stripped prior to splicing operations in the field. Stripping is usually performed using thermal strippers (e.g., Sumitomo ribbon stripper model JR-4A) at operating temperatures in the range of 70-100° C. For successful splicing, it is imperative that the polymer layers (inner and outer coatings, ink coating, matrix material) be removed from the ribbon cleanly and in an intact unit, i.e., leaving little debris on the stripped glass fiber. With an undesirable amount of debris, it is necessary to remove the debris, for example, by wiping the stripped fibers with an alcohol-moistened cloth. Unfortunately, with more debris, it is often necessary to wipe the fibers more than once. Correcting the problem of excessive debris therefore requires additional labor, time, and cost. Additionally, the act of repeated wiping may have the undesired consequence of weakening the glass fiber within the splice junction. For these reasons, wiping of the stripped glass fibers should be kept to a minimum.

Strip cleanliness is conventionally measured on a five-point scale, with a score of five being unclean and a score of one being clean. While the strip cleanliness will vary according to the needs, it is generally desirable for a stripped ribbon to possess optic fibers rated at a cleanliness of three or lower, more preferably two or lower. Tube-off is also measured on a five-point scale and is used as a means to assess the integrity of the polymers layers that are removed from the ribbon. A score of one means the polymer layers can be removed in an intact unit. A score of five means that there is total disintegration of the polymer layers and that they are not removed in an intact unit. As with the strip cleanliness, it is generally desirable for the optical fiber ribbon to possess a tube-off rating of three or lower, more preferably two or lower as this results in a reduced need to clean the strip tool, thus reducing splicing time.

Previous attempts to solve this problem have focused exclusively on the properties of the matrix material. One such approach is disclosed in U.S. Pat. No. 6,501,890 to Wilson et al., which suggests using a matrix material that exhibits a maximum tensile strength at 100° C. of at least about 1000 psi and an elongation at break at 100° C. of at least about 15 percent. Focusing on the properties of the matrix material, alone, ignores any interactions between the other polymeric materials that surround the glass fibers.

The present invention is directed to overcoming the above-noted deficiencies in the art, and achieving an optical fiber ribbon that possesses improved strip cleanliness and tube-off over a range of temperatures and strip conditions.

SUMMARY OF THE INVENTION

A first aspect of the present invention relates to an optical fiber ribbon that includes a plurality of optical fibers encapsulated within a matrix material, where the optical fiber coating(s) and the matrix material(s), and optionally any ink layers thereon, are characterized by compatible chemical and/or physical properties, whereby the fiber coating and matrix and any ink layers therebetween can be reliably stripped from the optical fibers to afford a suitable strip cleanliness.

According to one embodiment, the coating, matrix, and ink layer (if present) are each characterized by a glass transition temperature ($T_g$) and a fracture toughness ($K_{1C}$) value, and one or more of the following conditions are satisfied:

(i) the difference between the highest and lowest of the respective $T_g$ values is less than about 15° C., (ii) the respective $T_g$ values are at least about 60° C., (iii) the respective $K_{1C}$ values are at least about 0.8 MPa·m$^{1/2}$, or (iv) any two or more of (i), (ii), and (iii) are satisfied.

According to another embodiment, the coating, matrix, and ink layer (if present) are formed of a similar curable base formulation. That is, prior to forming the coating, matrix, or ink layer, the base formulation of oligomers and monomers is substantially similar and, consequently, compatible for use together.

A second aspect of the present invention relates to a telecommunication system that includes one or more optical fiber ribbons according to the first aspect of the present invention.

A third aspect of the present invention relates to an ink formulation that includes a pigment binder phase, a pigment or dye, and a phosphine oxide photoinitiator, wherein the ink formulation is characterized by a cure speed of at least about 80 percent acrylate conversion/second for the colors blue, green, yellow, black and brown, about 110 percent acrylate conversion/second for the color red, about 130 percent acrylate conversion/second for the colors orange and aqua, about 140 percent acrylate conversion/second for the colors white, violet and rose, and about 150 percent acrylate conversion/second for the color slate.

A fourth aspect of the present invention relates to a method of making an optical fiber ribbon that includes the steps of: providing a plurality of optical fibers, each having a coating; optionally applying an ink composition at least partially to one or more of the plurality of optical fibers; encapsulating the plurality of optical fibers in a matrix composition; and curing the matrix composition (and optionally the ink composition) to form an optical fiber ribbon according to the present invention.

By providing an optical fiber ribbon having polymeric coating, ink, and matrix materials that have compatible thermal-mechanical properties, the various coatings are better able to cooperate during the stripping process (that is, they behave similarly under the stripping conditions) to afford a consistent and suitable degree of strip cleanliness during stripping under both optimal and adverse conditions. Consequently, the use of such ribbons will afford significant savings during the installation of optical fiber ribbons in telecommunication transmission systems.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE INVENTION

The present invention relates to optical fiber ribbons and methods of making such ribbons, whereby the ribbons are capable of exhibiting improved fiber stripability under both normal and adverse stripping conditions.

Figure 1:
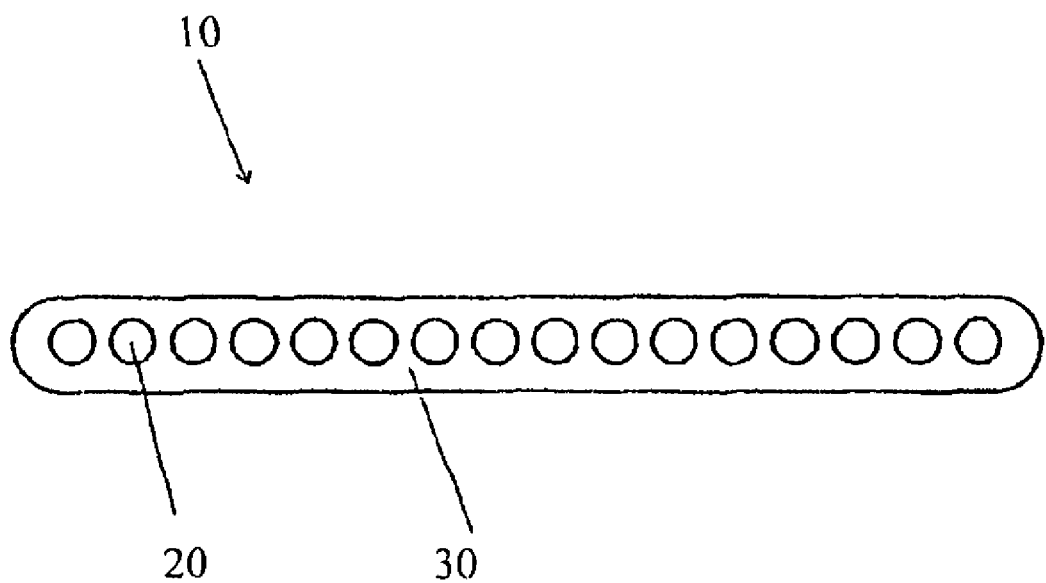
FIG. 1 is a cross-sectional view of an optical fiber ribbon according to an embodiment of the present invention.
Figure 2:
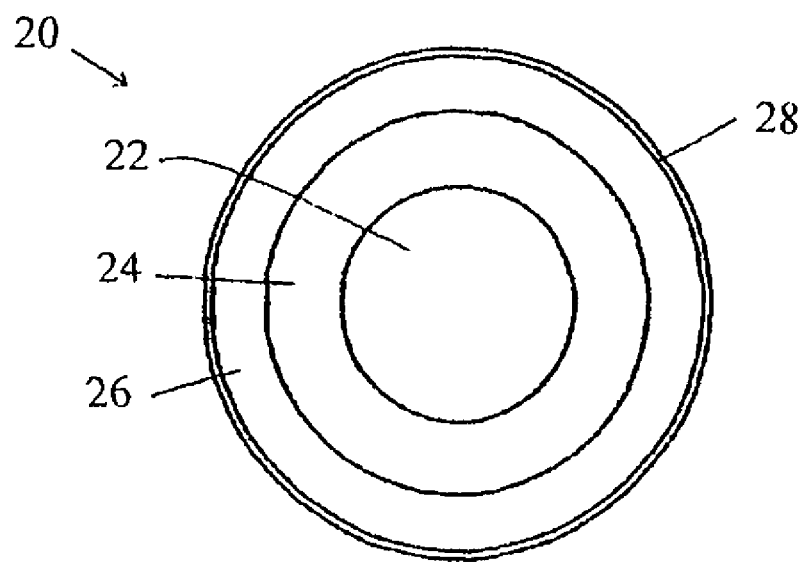
FIG. 2 is a cross-sectional of an optical fiber that includes a dual-coating system and an optional marking ink layer thereon.

Referring to both FIGS. 1 and 2, optical fiber ribbons 10 of the present invention include a plurality of substantially aligned optical fibers 20 that are encapsulated within a matrix 30. Each of the optical fibers 20 includes a glass fiber 22 (i.e., core and one or more cladding layers), and at least one but preferably two or more coatings 24, 26. Typical optical fibers utilize a dual coating system that includes a soft, pliable inner or primary coating 24 and a hard, protective outer or secondary coating 26. The matrix can be either a single layer matrix or a dual layer matrix (formed of inner and outer matrix materials). In addition to the coatings on the optical fiber itself and the matrix, an optional ink layer 28 can be applied to one or more of plurality of optical fibers to allow for identification of individual optical fibers.

The primary coating 24 is formed from a soft, crosslinked polymer material having a low Young's modulus (e.g., less than about 5 MPa at 25° C.) and a low glass transition temperature ($T_g$) (e.g., less than about −10° C.). The primary coating desirably has a higher refractive index than the cladding of the optical fiber in order to allow it to strip errant optical signals away from the optical fiber cladding. The primary coating should maintain adequate adhesion to the glass fiber during thermal and hydrolytic aging, yet be strippable therefrom for splicing purposes. The primary coating typically has a thickness in the range of 25-40 μm (e.g., about 32.5 μm). Primary coatings are typically applied to the glass fiber as a liquid and cured, as will be described in more detail hereinbelow. Conventional curable compositions used to form primary coatings are formulated using an oligomer (e.g., a polyether urethane acrylate), one or more monomer diluents (e.g., ether-containing acrylates), a photoinitiator, and other desirable additives (e.g., antioxidant). Primary coatings for optical fibers have been well-described in the past, and are familiar to the skilled artisan. Desirable primary coatings are disclosed in U.S. Pat. No. 6,326,416 to Chien et al., U.S. Pat. No. 6,531,522 to Winningham, U.S. Pat. No. 6,539,152 to Fewkes et al., U.S. Pat. No. 6,849,333 to Schissel et al., U.S. Pat. No. 6,563,996 to Winningham, and U.S. Pat. No. 6,869,981 to Fewkes et al.; and U.S. Patent Application Publ. No. 20030123839 to Chou et al., each of which is incorporated herein by reference in its entirety.

As noted above, the primary coating is typically surrounded by a secondary coating 26. Although the secondary coating is usually applied directly to the primary coating, the skilled artisan will recognize that there may be one or more intermediate coating layers deposited between the primary coating and the secondary coating. The secondary coating is formed from a cured polymeric material, and typically has a thickness in the range of 20-35 μm (e.g., about 27.5 μm). The secondary coating desirably has sufficient stiffness to protect the optical fiber; is flexible enough to be handled, bent, or spooled; has low tackiness to enable handling and prevent adjacent convolutions on a spool from sticking to one another; is resistant to water and chemicals such as optical fiber cable filling compound; and has adequate adhesion to the coating to which it is applied (e.g., the primary coating).

The cured polymeric materials used in the secondary coatings of the optical fibers may be the cured product of a curable composition including an oligomer and at least one monomer. As is conventional, the curable compositions used in forming the secondary coatings may also include photoinitiators, antioxidants, and other additives familiar to the skilled artisan. In desirable embodiments of the invention, the oligomer and monomers of the curable composition are ethylenically unsaturated and contain (meth)acrylate functional groups to facilitate curing. The oligomer may be, for example, a urethane (meth)acrylate oligomer. However, as the skilled artisan will recognize, oligomers and monomers adapted for other curing chemistries, such as epoxy, vinyl ether, and thiolene, may be used in accordance with the present invention.

Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

Exemplary polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g., SR349 and SR601 available from Sartomer Company, Inc. (West Chester, Pa.) and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149 (Cognis Corp.) and SR499 (Sartomer Company, Inc.)), propoxylated trimethylolpropane triacrylate with propoxylation being 3 or greater, preferably ranging from 3 to 30 (e.g., Photomer 4072 (Cognis Corp.) and SR492 (Sartomer)), and ditrimethylolpropane tetraacrylate (e.g., Photomer 4355 (Cognis Corp.)); alkoxylated glyceryl triacrylates such as propoxylated glyceryl triacrylate with propoxylation being 3 or greater (e.g., Photomer 4096 (Cognis Corp.) and SR9020 (Sartomer)); erythritol polyacrylates with and without alkoxylation, such as pentaerythritol tetraacrylate (e.g., SR295 (Sartomer)) ethoxylated pentaerythritol tetraacrylate (e.g., SR494 (Sartomer)), and dipentaerythritol pentaacrylate (e.g., Photomer 4399 (Cognis Corp.) and SR399 (Sartomer)); isocyanurate polyacrylates formed by reacting an appropriate functional isocyanurate with an acrylic acid or acryloyl chloride, such as tris-(2-hydroxyethyl)isocyanurate triacrylate (e.g., SR368 (Sartomer)) and tris-(2-hydroxyethyl)isocyanurate diacrylate; alcohol polyacrylates with and without alkoxylation such as tricyclodecane dimethanol diacrylate (e.g., CD406 (Sartomer)) and ethoxylated polyethylene glycol diacrylate with ethoxylation being 2 or greater, preferably ranging from about 2 to 30; epoxy acrylates formed by adding acrylate to bisphenol A diglycidylether (4 or more oxyethylene groups) and the like (e.g., Photomer 3016 (Cognis Corp.)); and single and multi-ring cyclic aromatic or non-aromatic polyacrylates such as dicyclopentadiene diacrylate and dicyclopentane diacrylate.

Exemplary monofunctional ethylenically unsaturated monomers include, without limitation, hydroxyalkyl acrylates such as 2-hydroxyethyl-acrylate, 2-hydroxypropyl-acrylate and 2-hydroxybutyl-acrylate (Aldrich); long- and short-chain alkyl acrylates such as methyl acrylate (Aldrich), ethyl acrylate (Aldrich), propyl acrylate (Aldrich), isopropyl acrylate, butyl acrylate (Aldrich), amyl acrylate, isobutyl acrylate (Aldrich), t-butyl acrylate (Aldrich), pentyl acrylate, isoamyl acrylate, hexyl acrylate (Aldrich), heptyl acrylate, octyl acrylate, isooctyl acrylate (e.g. SR 440 Sartomer), 2-ethylhexyl acrylate (Aldrich), nonyl acrylate, decyl acrylate, isodecyl acrylate (e.g. SR 395 Sartomer), undecyl acrylate, dodecyl acrylate, lauryl acrylate (e.g. SR 335 Sartomer), octadecyl acrylate (Aldrich), and stearyl acrylate (e.g. SR257 Sartomer); amino alkyl acrylates such as dimethylaminoethyl acrylate (Aldrich), diethylamino ethyl acrylate (Aldrich), and 7-amino-3,7-dimethyloctyl acrylate; alkoxyalkyl acrylates such as butoxyethyl acrylate (Aldrich), phenoxyethyl acrylate (e.g., SR339 Sartomer)), and ethoxyethoxyethyl acrylate (SR 256 Sartomer); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506 (Sartomer)), tetrahydrofurfuryl acrylate (e.g., SR285 (Sartomer)), caprolactone acrylate (e.g., SR495 (Sartomer)), and acryloylmorpholine alcohol-based acrylates such as polyethylene glycol monoacrylate (Aldrich), polypropylene glycol monoacrylate (Aldrich), methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4003 (Henkel)); acrylamides such as diacetone acrylamide (Aldrich), isobutoxymethyl acrylamide (Aldrich), N,N'-dimethyl-aminopropyl acrylamide, N,N-dimethyl acrylamide (Aldrich), N,N-diethyl acrylamide (Aldrich), and t-octyl acrylamide; vinylic compounds such as N-vinylpyrrolidone (ISP Corporation) and N-vinylcaprolactam (ISP Corporation); and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

The oligomeric component can include a single type of oligomer or it can be a combination of two or more oligomers. When employed, if at all, the oligomeric component introduced into the compositions of the present invention preferably comprises ethylenically unsaturated oligomers. While the oligomeric component can be present in an amount of 15 weight percent or less, it is preferably present in an amount of about 13 weight percent or less, more preferably about 10 weight percent or less, even more preferably less than about 10 percent, and most preferably about 9 percent of less. While maintaining suitable physical characteristics of the composition and its resulting cured material, it is more cost-effective and, therefore, desirable to prepare compositions containing preferably less than about 5 weight percent or substantially devoid of the oligomeric component.

When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

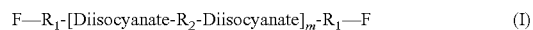

$$F—R_1-[\text{Diisocyanate}-R_2-\text{Diisocyanate}]_m-R_1—F \quad (I)$$

wherein,

F is independently a reactive functional group such as acrylate, methacrylate, acrylamide, N-vinyl amide, styrene, vinyl ether, vinyl ester, or other functional group known in the art;

$R_1$ includes, independently, $—C_{2\text{-}20}—$, $—C_{2\text{-}4}—O)_n—$, $—C_{2\text{-}20}—(C_{2\text{-}4}—O)_n—$, $—C_{2\text{-}20}—(CO—C_{2\text{-}5}—O)_n—$, or $—C_{2\text{-}20}—(CO—C_{2\text{-}5}—NH)_n$ where n is a whole number from 1 to 30, preferably 1 to 10;

$R_2$ is polyether, polyester, polycarbonate, polyamide, polyurethane, polyurea, or combinations thereof; and m is a whole number from 1 to 10, preferably 1 to 5.

In the structure of formula (I), the diisocyanate group is the reaction product formed following bonding of a diisocyanate to $R_2$ and/or $R_1$. The term "independently" is used herein to indicate that each F group may differ from another F group and the same is true for each R group.

Other polyfunctional oligomers preferably have a structure according to formulae (II), (III), or (IV) as set forth below:

$$\text{multiisocyanate-}(R_2\text{—}R_1\text{—}F_2)_x \quad (II)$$

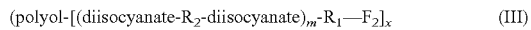
$$\text{(polyol-[(diisocyanate-}R_2\text{-diisocyanate})_m\text{-}R_1\text{—}F_2]_x \quad (III)$$

$$\text{or multiisocyanate-}(R_1\text{—}F_2)_x \quad (IV)$$

wherein,
- $F_2$ independently represents from 1 to 3 functional groups such as acrylate, methacrylate, acrylamide, N-vinyl amide, styrene, vinyl ether, vinyl ester, or other functional groups known in the art;
- $R_1$ can include $-C_{2-20}$, $-(C_{2-4}-O)_n-$, $-C_{2-20}-(C_{2-4}-O)_n-$, $-C_{2-20}-(CO-C_{2-5}-O)_n-$, or $-C_{2-20}-(CO-C_{2-5}-NH)_n$ where n is a whole number from 1 to 30, preferably 1 to 10;
- $R_2$ can be polyether, polyester, polycarbonate, polyamide, polyurethane, polyurea or combinations thereof;
- x is a whole number from 1 to 10, preferably 2 to 5; and
- m is a whole number from 1 to 10, preferably 1 to 5.

In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a hydric polyether or polyester, most typically a polyoxyalkylene glycol such as a polyethylene glycol. Such oligomers typically have between about four to about ten urethane groups and may be of high molecular weight, e.g., 2000-8000. However, lower molecular weight oligomers, having molecular weights in the 500-2000 range, may also be used. U.S. Pat. No. 4,608,409 to Coady et al. and U.S. Pat. No. 4,609,718 to Bishop et al., each of which is hereby incorporated by reference in its entirety, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2-250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the coating systems is not considered detrimental to coating performance, provided only that the diamines or polyamines employed in the synthesis are sufficiently non-polar and saturated so as to avoid compromising the moisture resistance of the system.

The total oligomer content of the secondary coating composition is preferably less than about 25%, and the total monomer content is greater than about 65%. In especially desirable embodiments, the total oligomer content is less than about 15% and the total monomer content is greater than about 75%. Use of relatively low amounts of oligomer allows the skilled artisan to easily formulate curable compositions having a desirable viscosity. As the oligomer is typically a more expensive component of the composition, minimization of the amount of oligomer also allows the skilled artisan to reduce the cost of the curable composition, as well as the cost of articles, such as optical fibers, coated therewith. Secondary coating compositions having low oligomer content are described in more detail in U.S. Pat. No. 6,775,451 to Botelho et al., which is hereby incorporated by reference in its entirety. The oligomer is desirably present in the curable composition at a concentration of at least about 1 wt %.

The curable compositions, both primary and secondary compositions, may also include a polymerization initiator. Any suitable photoinitiator can be introduced into compositions of the present invention. The initiator is desirably present in an amount effective to initiate polymerization of the curable composition. Polymerization initiators suitable for use in the curable compositions include thermal initiators, chemical initiators, electron beam initiators, microwave initiators, actinic radiation initiators, and photoinitiators. Preferred curable compositions of the present invention are adapted to be cured by actinic radiation, and include one or more photoinitiators. For most (meth)acrylate-based curable compositions, conventional photoinitiators, such as ketonic and/or phosphine-oxide based initiators, may be used. Generally, the total photoinitiator content of the curable composition is between about 0.1 and about 10.0 weight percent. More desirably, the total photoinitiator content of the curable composition is between about 1.0 and about 7.5 weight percent.

Suitable photoinitiators include, without limitation, 1-hydroxycyclohexylphenyl ketone (e.g., Irgacure 184 (Ciba Specialty Chemical, Tarrytown, N.Y.)), (2,6-1 dimethoxybenzoyl)-2,4,4-trimethylpentyl phosphine oxide (e.g., in commercial blends Irgacure 1800, 1850, and 1700 (Ciba)), 2,2-dimethoxy-2-phenyl acetophenone (e.g., Irgacure 651 (Ciba)), bis(2,4,6 trimethylbenzoyl)phenyl phosphine oxide (e.g., Irgacure 819 (Ciba)), (2,4,6-trimethylbenzoyl)diphenyl phosphine oxide (e.g., in commercial blend Darocur 4265 (Ciba)), 2-hydroxy-2-methyl-1-phenylpropane-1-one (e.g., in commercial blend Darocur 4265 (Ciba)), and combinations thereof. Other photoinitiators are continually being developed and used in coating compositions on glass fibers. Any suitable photoinitiator can be introduced into compositions of the present invention.

In addition to the above-described components, the secondary coating compositions can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A non-exhaustive list of optional preferred additives includes surfactants, surface agents, slip additives, waxes, micronized-polytetrafluoroethylene, and combinations thereof. Preferably a surfactant comprises a compound which includes one or more polar sections and one or more non-polar sections. A surfactant is not limited to only a compound which modifies surface conditions. Preferably a surface agent is a particular type of surfactant which may be used to modify surface conditions.

Other suitable materials for use in secondary coating materials, as well as considerations related to selection of these materials, are well known in the art and are described in U.S. Pat. Nos. 4,962,992 and 5,104,433 to Chapin, each of which is hereby incorporated by reference in its entirety.

Optical fibers useful in preparing optical fiber ribbons of the present invention can be of any conventional design and construction, such as the type described above. The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. It is frequently advantageous to apply both primary and secondary coating compositions in sequence following the draw process. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,851,165 to Rannell et al., which is hereby incorporated by reference in its entirety. Of course, the primary coating composition can be applied and cured to form the primary coating material, then the curable composition described hereinabove can be applied and cured to form the cured polymeric material of the secondary coating.

The curable secondary coating compositions may also be advantageously used in the formulation of marking inks for optical fibers. As noted above in reference to FIG. 2, the coated optical fiber 20 can also include a marking ink 28 deposited on the exterior of the coating system, e.g., the dual coating system as described above. A marking ink is typically formed as a thin layer of a colored coating on the outer surface of a secondary coating of an optical fiber. The marking ink can be formed by adding pigments and/or dyes to a pigment binder phase (i.e., a curable secondary coating composition containing oligomer(s) and monomer(s) and co-monomers). The co-monomer components are preferably polar, non acrylate monomers (e.g., N-vinyl caprolactam monomer).

Preferred marking inks include a pigment binder phase, a pigment or dye, and a phosphine oxide photoinitiator, wherein the ink formulation is characterized by a cure speed of at least about 80 percent acrylate conversion/second, more preferably between about 80 and about 500 percent acrylate conversion/second, or between about 100 and about 400 percent acrylate conversion/second. Desirably, the ink formulation is characterized by either a $T_g$ value that is at least about 60° C., a $K_{1C}$ value that is at least about 0.8 MPa·m$^{1/2}$, or both. Cure speed is a measure of the percent of acrylate conversion per second (percent/s). The percentage of cure was evaluated in accordance with the Fourier Transform Infrared Spectroscopy analyses. Basically, an uncured film is applied to an ASI DuraSamplir® ATR crystal (or equivalent) at ~1 mm thickness, the film is purged with nitrogen for 30 sec, and then irradiated to induce polymerization with, e.g., Lesco Mark II Spot cure unit and UniBlitz® VS25 Shutter Assembly with model T132 driver. The shutter is opened for a 1 sec exposure, and spectra are collected at 6 ms intervals for 0.9 sec. Following the 0.1 sec pause, spectra are again collected for 5 sec following initial exposure. The shutter again opens for a 10 sec exposure, which allows for calculation of the 100% cure band ratio. Both uncured and fully cured band ratio are calculated for each, and a cure vs. time plot is constructed using conventional software, e.g., OPUS v3.04 in OS/2 (Spectrometer operation and data manipulation), Galactic Grams32 v5.02, and MicroCal Origin v6.0. The polymerization rate, Rp, can be calculated at any point in the curve from the slope of the curve, and the maximum polymerization rate is preferably estimated as the slope of the curve from 10% conversion to 40% conversion. The reported cure speed number is the slope of the line within this range Preferred pigments or dyes are preferably not greater than about 1 micron. Exemplary pigments and dyes (and the respective colors thereof) include, without limitation: titanium dioxide, which is a white pigment; phthalocyanine blue and indanthrone blue, which are blue pigments; azo yellow, diarylide yellow, and isoindolinone yellow, which are yellow pigments; phthalocyanine green, which is a green pigment; azo red, naphthol red, and perylene red, which are red pigments; carbon blacks, which are black pigments; pyrazolone orange, which is an orange pigment; and _carbazole and quinacridone violet, which are violet pigments; The remaining colors of brown, slate, aqua and rose can be made using the appropriate combinations of the above listed pigments. Other pigments are known and others are continually being developed so that they have cure speeds within the above-noted ranges and preferences in the preceding paragraphs.

Preferred cure speeds are accomplished by formulating inks that contain either a MAPO or BAPO photoinitiator blend in conjunction with Irgacure 184, an optical brightener, and a small amount of N-vinyl caprolactam monomer. Another aspect of the formulation that contributes to the preferred cure speeds is the optimization of the pigment dispersion such that substantially all pigment particles (i.e., 99 percent or more) are less than about 1 micron in size. This very small average particle size results in higher tint strengths, which allows lower pigment levels to meet the desired color targets.

Additional components that can be added to facilitate the desired cured properties include coupling agents (e.g., titanates or zirconates as described in U.S. Pat. No. 6,553,169 to Fabian, which is incorporated herein by reference in its entirety), surface action agents (e.g., slip agents such as Tego-Rad 2250, a silicone polyether acrylate available from Tego Chemie/Goldschmidt Chemical Corp.; anti-static agents and matting agents, and combinations thereof.

The ribbons 10 of the present invention can be fabricated using previously formed optical fibers 20 prepared as described above. The matrix 30 is the cured product of a curable composition, preferably a composition that is, itself, suitable for use as a secondary coating on an optical fiber. The matrix can be formed of a curable composition that is the same as the secondary coating on the plurality of optical fibers, or the matrix can be formed of a different curable composition.

One embodiment of a ribbon of the present invention is illustrated in FIG. 1. As shown therein, fiber optic ribbon 10 of the present invention includes a plurality of single or multi-layered optical fibers 20 substantially aligned relative to one another in a substantially planar relationship and encapsulated by matrix 30. The skilled artisan will appreciate that the optical fibers 20 may include a dual-layer coating system (for example, the primary and secondary coatings described hereinabove), and may be colored with a marking ink. It is desirable that optical fibers 20 are not displaced from a common plane by a distance of more than about one-half the diameter thereof. By substantially aligned, it is intended that the optical fibers 20 are generally parallel with other optical fibers along the length of the fiber optic ribbon 10. In FIG. 1, the fiber optic ribbon 10 contains sixteen (16) optical fibers 20; however, it should be apparent to those skilled in the art that any number of optical fibers 20 (e.g., two or more) may be employed to form fiber optic ribbon 10 disposed for a particular use.

The optical fibers in fiber optic ribbons of the present invention may be encapsulated by the matrix 30 in any known configuration (e.g., edge-bonded ribbon, thin-encapsulated ribbon, thick-encapsulated ribbon, or multi-layer ribbon) by conventional methods of making fiber optic ribbons.

The fiber optic ribbon may be prepared by conventional methods using appropriate curable compositions to form the matrix material. For example, upon alignment of a plurality of substantially planar optical fibers, the desired ink and matrix compositions can be applied and cured according to the methods of preparing optical fiber ribbons as described in U.S. Pat. No. 4,752,112 to Mayr and U.S. Pat. No. 5,486,378 to Oestreich et al., each of which is incorporated herein by reference in its entirety. Curing of the ink layer and matrix layer(s) can be performed as a single step or as multiple steps following each application.

To facilitate improved ribbon stripability in accordance with the present invention, the optical fiber coating (e.g., secondary coating), the optional ink layer, and the matrix material are characterized by matched or compatible thermal-mechanical properties.

According to one approach, the two or more of the various polymeric materials that are adjacent to one another (i.e., the fiber coating(s), the optional ink layer, and the matrix material (s)) are formed from a similar base composition. That is, the base formulation for the polymeric material is either identical (containing exactly the same amount of the same monomer and oligomer components prior to the addition of any additives specific for the particular application) or substantially the same. That is, the base formulation can contain a minor variation, e.g., less than about 10 percent or more preferably less than about 5 percent variation in the amount of monomer or oligomer components, replacement of one or more monomer or oligomer components with an analog equivalent thereof, or both.

As used herein, the term "matched or compatible thermal-mechanical properties" is intended to reflect that two or more of the various polymeric materials that are adjacent to one another possess one or more closely related thermal-mechanical properties. That is, the thermal-mechanical property of interest indicates that the two materials will behave similarly under applied thermal or stress conditions. Exemplary thermal-mechanical properties include, without limitation, glass transition temperature ($T_g$), fracture toughness ($K_{1C}$), tensile (Young's) modulus, and ductility.

One aspect of the present invention relates to an optical fiber ribbon that includes a plurality of optical fibers encapsulated within a matrix material, where the optical fiber coating(s) and the matrix material(s), and optionally any ink layers thereon, are characterized by compatible chemical and/or thermal-mechanical properties, whereby the coatings and matrix and any ink layers therebetween can be reliably stripped from the optical fibers to afford a suitable strip cleanliness.

According to one embodiment, the coating, matrix, and ink layer (if present) are each characterized by a $T_g$ value, a $K_{1C}$ value, a tensile modulus value, and a ductility parameter value, and one or more of the following conditions are satisfied:

(i) the difference between the highest and lowest of the respective $T_g$ values is less than about 15° C., preferably less than about 14°, 13°, 12°, 11°, or 10° C., more preferably less than about 9°, 8°, 7°, 6°, or 5°, most preferably less than about 4°, 3°, 2°, or 10° C.;

(ii) each of the $T_g$ values is greater than about 60° C.;

(iii) the respective $K_{1C}$ values are at least about 0.8 MPa·m$^{1/2}$, preferably at least about 0.85, 0.90, 0.95, or 1.0, more preferably at least about 1.05, 1.1, 1.15, or 1.2 MPa·m$^{1/2}$, most preferably at least about 1.25, 1.3, 1.35, or 1.4 MPa·m$^{1/2}$;

(iv) the difference between the highest and lowest of the respective tensile modulus values is less than about 500 MPa, more preferably less than about 450, 400, 350, or 300 MPa, most preferably less than about 250, 200, 150, or 100 MPa;

(v) the ductility value is at least about 350 microns, more preferably at least about 360, 370, 380, 390, or 400 microns, most preferably at least about 410, 420, 430, 440, or 450 microns; or (vi) any combination of two or more of (i)-(v), more preferably three or more of (i)-(v), and most preferably four or five of (i)-(v).

Thus, in the absence of an ink layer, the differences between the $T_g$ values and/or tensile modulus values of the optical fiber (secondary) coating and the (inner) matrix are directly compared. In the presence of the ink layer, however, only the highest and lowest values of the three are compared.

The glass transition temperature ($T_g$) refers to the temperature below which a coating (or ink or matrix) material is brittle and above which it is flexible. An alternative (and more accurate) definition is based on the fact that at the glass transition temperature, the coefficient of thermal expansion changes sharply. The glass transition temperature can be a single degree or a short range of degrees. It is preferable that the glass transition temperature for one or more (more preferably two or more, and most preferably all three) of the coating, the ink, and matrix is greater than 60° C.

The glass transition temperature ($T_g$) of polymeric materials may be measured by a variety of techniques such as differential scanning calorimetry (DSC) or dynamic mechanical analysis (DMA). The coatings evaluated in this body of work were done so by the use of the DMA. In DMA analysis (and in the data presented in this application) the value used for the $T_g$ is frequently defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation. See Ferry, J. D. In *Viscoelastic Properties of Polymers*, 3$^{rd}$ ed., Wiley: New York, 1980, Chapter 1. The maximum value of the tan delta peak, while serving as a convenient measure of the Tg, typically exceeds the value that is obtained when the Tg is measured by methods such as DSC.

The $T_g$ value as measured for cross linked materials, also will typically give rise to broader peaks than will be obtained in non-crosslinked polymeric materials. For materials that are crosslinked, the ranges of $T_g$ overlap described earlier are appropriate for use in this invention, but the overlap for lower crosslink density or non-crosslinked thermoplastic materials may be more complete.

Figure 3:
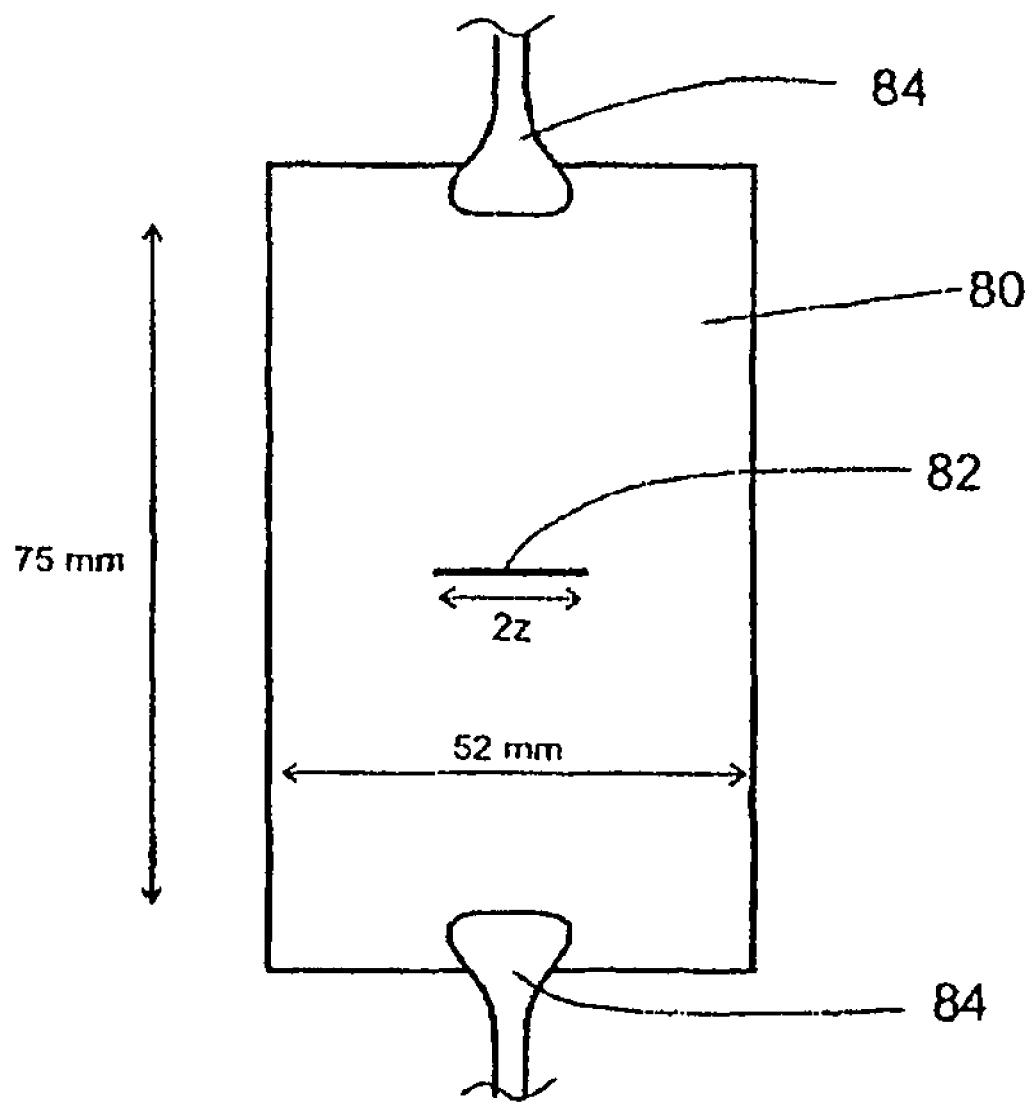
FIG. 3 is a schematic view of a film sample used in the measurement of fracture toughness.

The resistance of a material to unstable, catastrophic crack growth is described by the material property known as fracture toughness, $K_{1C}$. The fracture toughness of a material relates to the energy required to propagate a crack in the material. As used herein, fracture toughness $K_{1C}$ is measured on film samples, and is defined as $Y\sigma\sqrt{z}$, where Y is a geometry factor, σ is the tensile strength (at break) of the film sample, and z is half of the notch length. Fracture toughness is measured on films having a center cut notch geometry. FIG. 3 is a schematic depiction of the sample geometry used in measuring fracture toughness. Film sample 80 has a width of about 52 mm, and is about 0.010" (254 μm) in thickness. A notch 82 is cut in the center of the film using a sharp blade using methods familiar to the skilled artisan. Notches having lengths of 18 mm, 24 mm, and 30 mm are cut in different samples. The tensile strength (at failure) of the sample, σ, is measured using a tensile testing instrument (e.g. a Sintech MTS Tensile Tester, or an Instron Universal Material Test System), as described above. The sample is gripped in the jaws 84 of the tensile testing instrument such that the gauge length is 75 mm. The displacement rate is 2.0 mm/min. The tensile strength may be calculated by dividing the applied load at failure by the cross-sectional area of the intact sample. For the samples described above, the tensile strength may be calculated using the equation $$\sigma = \frac{Load}{254\ \mu m\ (52\ mm - 2z)}.$$

Y is a geometry factor, and is defined as $1.77-0.177(2\lambda)+1.77(2\lambda)^2$, where λ=z/sample width.

The tensile (Young's) modulus value is a measure of the stress applied to a sample (of the coating material, ink layer, or matrix material) at the time of breakage. It is preferable that the tensile modulus for one or more (more preferably two or more, and most preferably all three) of the coating, the ink, and matrix is at least about 1200 MPa, more preferably at least about 1500 MPa, most preferably at least about 1900 MPa. As used herein, the Young's modulus, is measured using a tensile testing instrument (e.g. a Sintech MTS Tensile Tester, or an Instron Universal Material Test System) on a sample of a material shaped as a cylindrical rod about 0.0225" (571.5 μm) in diameter, with a gauge length of 5.1 cm, and a test speed of 2.5 cm/min.

The sensitivity of the cured polymeric material of the secondary coating (or matrix or ink layer) to handling and the formation of defects is reflected by its ductility. The ductility of a material is defined by the equation $$Ductility = \left(\frac{K_{1C}}{yield\ stress}\right)^2.$$

Larger ductilities indicate reduced sensitivity of the secondary coating to handling and defect formation. Yield stress can be measured on the rod samples at the same time as the Young's modulus, elongation to break, and tensile strength, as described above. As is familiar to the skilled artisan, for samples that exhibit strain softening, the yield stress is determined by the first local maximum in the stress vs. strain curve. More generally, the yield stress can be determined using the method given in ASTM D638-02, which is incorporated herein by reference in its entirety.

According to another embodiment, the coating, matrix, and ink layer (if present) are each formed of a similar curable base formulation. That is, prior to forming the coating, matrix, or ink layer, the base formulation of oligomers and monomers is substantially similar and, consequently, compatible for use together.

A preferred base composition that can be used for the secondary coating, the marking ink, and/or the matrix includes: 20 weight percent of Photomer 3016, a high viscosity epoxy acrylate monomer (Cognis); 77 weight percent of Photomer 4028, an ethoxylated (4 moles) bisphenol A diacrylate monomer (Cognis); 1.5 weight percent Lucirin TPO, a 2,4,6-trimethylbenzoyl-diphenyl phosphine oxide (BASF); 1.5 weight percent Irgacure 184, a hydroxy-cyclohexyl phenyl ketone (Ciba)); and 0.5 pph Irganox 1035, a thiodiethylene bis {3-(3,5-di-tert-butyl-4-hydroxyphenyl)propionate} (Ciba).

Having prepared an optical fiber ribbon of the present invention, the ribbon is intended to be integrated into an optical fiber data transmission system, such as the type used in telecommunication systems.

EXAMPLES

The following examples are provided to illustrate embodiments of the present invention but are by no means intended to limit its scope.

Example 1

Preparation of Optical Fiber Ribbons

Optical fiber ribbons were fabricated using previously prepared optical fibers that possessed either a high $T_g$ (>60 C) secondary coating ("Coating A") or a lower $T_g$ (<55 C) secondary coating ("Coating B").

Ink compositions that were used to cover the optical fibers included either DSM-LTS ("Ink A"), an ink coating commercially available from DSM Desotech, Inc. (Elgin, Ill.); a base composition containing 20% Photomer 3016 (Cognis), 77% Photomer 4028 (Cognis), 1.5% Lucirin TPO (BASF), 1.5% Irgacure 184, and 0.5 pph Irganox 1035 ("Ink B") or a base composition containing 10% KWS4131 (Bomar), 5% Photomer 3016 (Cognis), 82% Photomer 4028 (Cognis), 1.5% Lucirin TPO (BASF), 1.5% Irgacure 184 (Ciba) and 0.5 pph Irganox 1035 (Ciba) ("Ink C")

Dual matrix systems included both an inner matrix and an outer matrix. Inner matrix materials included either DSM 950-716, a urethane acrylate based matrix material commercially available from DSM Desotech, Inc. ("Inner Matrix A"), the base composition of Ink B absent any pigments ("Inner Matrix B"), or the base composition of Ink C absent any pigments ("Inner Matrix C"). The outer matrix material that was used was DSM 9D9-518 from DSM Desotech, Inc.

All ribbons were prepared using a dual-layer, 12-fiber dry lock system using standard manufacturing procedures. A total of four ribbons were prepared as described in Table 1 below. The physical properties of the various coatings, inks, and inner and outer matrices are provided in Table 2 below.

TABLE 1

Construction of Dual Layer Matrix Ribbons

| Ribbon No. | Secondary Fiber Coating | Ink | Inner Matrix | Outer Matrix |
|---|---|---|---|---|
| 1 | Coating A | Ink A | Inner Matrix A | Outer Matrix A |
| 2 | Coating A | Ink A | Inner Matrix B | Outer Matrix A |
| 3 | Coating A | Ink B | Inner Matrix B | Outer Matrix A |
| 4 | Coating B | Ink C | Inner Matrix C | Outer Matrix A |

TABLE 2

Physical Properties of Fiber Coatings, Inks, and Matrix Materials

| Polymer Material | $T_g$ Value (° C.) | $K_{1C}$ Value (MPa·m$^{1/2}$) | Tensile Modulus (MPa) | Ductility (in microns) |
|---|---|---|---|---|
| Secondary Fiber Coating A | 80 | 1.2655 | 1900 | 403 |
| Secondary Fiber Coating B | 55 | 0.7587 | 1500 | 390 |
| Ink A | 75 | 0.6955 | 1505 | 274 |
| Ink B | 80 | 1.2655 | 1900 | 403 |
| Ink C | 55 | 0.7587 | 1500 | 390 |
| Inner Matrix A | 57 | 0.6809 | 1100 | 229 |
| Inner Matrix B | 80 | 1.2655 | 1900 | 403 |
| Inner Matrix C | 55 | 0.7587 | 1500 | 390 |

Example 2

Testing of Ribbons for Strip Cleanliness

All ribbons were stripped using a Sumitomo JR4A stripper set at 90° C., the purpose of which was to simulate worst case conditions that may be found in the field. Stripping was performed by hand, at either subjectively defined slow or fast rates. Ribbon strip performance was evaluated with ratings assigned for both cleanliness and tube-off.

Strip cleanliness was measured by examining the stripped optical fiber for debris. As described above, a score of one (1) identifies a fiber having a low amount of debris on its surface and a score of five (5) represents a fiber having a significant amount of debris on its surface. Any score of three (3) or less was deemed to be acceptable strip cleanliness. Cleanliness measurements were obtained by visually inspecting a segment of the stripped ribbon fibers with the naked eye. Particles remaining on the stripped ribbon fibers were examined and compared to limit samples which were rated according to the following standard:

| Number of Particles | Cleanliness Rating |
|---|---|
| 0-10 | 1 |
| 11-20 | 2 |
| 21-40 | 3 |
| >40 and needs extra cleaning | 4 |
| >40 and extra cleaning ineffective | 5 |

A total of five segments were measured for each ribbon, and the average score appears in Table 3 below.

Tubeoff values were measured by examining the integrity of the tube and comparing it to limit samples in order to assign a value of 1 to 5 with a score of one (1) meaning that the tube is totally intact in one unit and a score of five (5) meaning that the tube totally disintegrated in the strip tool.

TABLE 3

Strip Cleanliness of Stripped Ribbons

| Ribbon No. | Fast Strip Cleanliness | Fast Strip Tubeoff | Slow Strip Cleanliness | Slow Strip Tubeoff |
|---|---|---|---|---|
| 1 | 2.0 | 4.0 | 2.4 | 2.2 |
| 2 | 2.0 | 4.0 | 2.0 | 1.6 |
| 3 | 2.0 | 2.0 | 1.0 | 1.0 |
| 4 | 2.0 | 4.4 | 2.0 | 4.6 |

The best results were obtained from Ribbon 3, which possessed a secondary fiber coating, ink layer, and inner matrix that were formed from the same base formulation. The good tubeoff performance can be attributed to the high $T_g$ of this shared base formulation (80° C.), which helps to maintain the integrity of the tube at the strip temperature, and the good adhesion between the layers, which prevents delaminations in the tube during strip operations. Ribbon 4 demonstrates the preference of using polymeric materials having $T_g$ values of greater than about 60° C. Ink C and inner matrix C are characterized by a $T_g$ in the range of about 50-55 C.

Example 3

Comparison of Marking Ink Degree of Cure

Ink formulations were prepared using one or more of the following components: Photomer 3016, a high viscosity epoxy acrylate monomer (Cognis); Photomer 4028, an ethoxylated (4 moles) BPA diacrylate monomer (Cognis); V-Cap/RC, n-vinyl caprolactam monomer from ISP Corporation; Lucirin TPO, 2,4,6-trimethylbenzoyl-diphenyl phosphine oxide (BASF); Irgacure 184, a hydroxy-cyclohexyl phenyl ketone (Ciba); Uvitex OB, a 2,5-thiophenediylbis(5-tert-butyl-1,3-benzoxazole) optical brightener (Ciba); Irganox 1035, a thiodiethylene bis {3-(3,5-di-tert-butyl-4-hydroxyphenyl)propionate} (Ciba); and TegoRad 2250, a silicone polyether acrylate slip agent (Tego Chemie/Goldschmidt Chemical Corp., Hopewell, Va.).

The above base formulation was combined with the appropriate pigments to prepare violet, red, white, blue, brown, and black inks.

In addition, Cablelite 751 ink formulations obtained from DSM Desotech were compared side-by-side to the above inks.

The various ink formulations were coated onto optical fibers and passed through a die to control thickness to 3-5 µm. Fibers were cured at a line speed of 1000 m/min with 100% lamp power using a D bulb. The degree of cure for each marking ink was determined by depletion of acrylate groups as determined via Fourier Transform InfraRed Spectroscopy using standard attenuated total internal reflection methods typically used in coatings industry. The results of the degree of cure measurements are presented in Table 4 below.

| Color | DSM Ink | Inventive Ink |
|---|---|---|
| Violet | 77.07 | 91.42 |
| Red | 73.83 | 92.79 |
| White | 78.62 | 90.10 |
| Blue | 73.62 | 95.06 |
| Brown | 68.79 | 93.08 |
| Black | 81.46 | 94.65 |

The above data demonstrates that the ink formulations of the present invention can achieve significantly higher degrees of cure (under similar UV doses) than one of the more preferred commercially available ink formulations. This will allow even higher processing speeds during ink coating and ribbon formation, as well as minimize defects during manufacture.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. An ink formulation comprising a pigment binder phase comprising one or more oligomer and/or monomer components having an acrylate functional group, a polar non-acrylate monomer component, a pigment or dye, an optical brightener, and a phosphine oxide photoinitiator, wherein the ink formulation is characterized by a cure speed of at least about 80 percent acrylate conversion/second for the colors blue, green, yellow, black and brown; about 110 percent acrylate conversion/second for the color red; about 130 percent acrylate conversion/second for the colors orange and aqua; about 140 percent acrylate conversion/second for the colors white, violet and rose; and about 150 percent acrylate conversion/second for the color slate.

2. The ink formulation according to claim 1, wherein the ink formulation has a cure speed of between about 80 and about 500 percent acrylate conversion/second.

3. The ink formulation according to claim 1, wherein the polar non-acrylate monomer component is an N-vinyl caprolactam.

4. The ink formulation according to claim 1, wherein the ink formulation comprises pigment that is not greater than about 1 micron.

5. The ink formulation according to claim 1, wherein the optical brightener is 2,5-thiophenediylbis(5-tert-butyl-1,3-benzoxazole).

6. The ink formulation according to claim 1 further comprising a surface active agent.

7. The ink formulation according to claim 6, wherein the surface active agent is selected from the group consisting of slip agents, anti-static agents, and matting agents.

8. The ink formulation according to claim 1, wherein a cured product of the ink formulation has either a $T_g$ value that is at least about 60° C., a $K_{1C}$ value that is at least about 0.8 MPa·m$^{1/2}$, or both.

9. The ink formulation according to claim 1, wherein a cured product of the ink formulation has a $K_{1C}$ value that is at least about 0.8 MPa·m$^{1/2}$.

10. The ink formulation according to claim 1, wherein a cured product of the ink formulation has a $K_{1C}$ value that is at least about 1.0 MPa·m$^{1/2}$.

11. The ink formulation according to claim 1, wherein a cured product of the ink formulation has a $K_{1C}$ value that is at least about 1.2 MPa·m$^{1/2}$.

12. The ink formulation according to claim 1, wherein a cured product of the ink formulation has a ductility value that is at least about 350 microns.

13. The ink formulation according to claim 1, wherein a cured product of the ink formulation has a ductility value that is at least about 400 microns.

14. The ink formulation according to claim 1, wherein the ink formulation achieves a degree of cure in excess of 90% when applied to a fiber at a thickness of 3-5 µm and exposed to a D bulb at full power and a line speed of 1000 m/min.

* * * * *